United States Patent [19]

Cipolla

[11] Patent Number: 4,957,571
[45] Date of Patent: Sep. 18, 1990

[54] METHOD FOR APPLYING RECLOSABLE FASTENER TO PACKAGE

[75] Inventor: Peter C. Cipolla, El Toro, Calif.
[73] Assignee: Multivac, Kansas City, Mo.
[21] Appl. No.: 278,586
[22] Filed: Dec. 1, 1988
[51] Int. Cl.⁵ .............................................. B32B 31/08
[52] U.S. Cl. ...................................... 156/66; 24/576; 24/587; 156/499; 383/63
[58] Field of Search .................... 24/576, 587; 156/66, 156/499; 383/63

[56] References Cited

U.S. PATENT DOCUMENTS

| | | | |
|---|---|---|---|
| 3,532,571 | 10/1970 | Ausnit | 156/91 |
| 3,948,705 | 4/1976 | Ausnit | 156/66 X |
| 4,246,288 | 1/1981 | Sanborn, Jr. | 426/122 |
| 4,355,494 | 10/1982 | Tilman | 53/416 |
| 4,437,293 | 3/1984 | Sanborn, Jr. | 53/412 |
| 4,589,145 | 5/1986 | Van Erden | 383/5 |
| 4,617,683 | 10/1986 | Christoff | 383/63 |
| 4,812,192 | 3/1989 | Woods et al. | 156/66 X |

Primary Examiner—Robert A. Dawson
Attorney, Agent, or Firm—Kokjer, Kircher, Bradley, Wharton, Bowman & Johnson

[57] ABSTRACT

An apparatus and method for forming reclosable packages for food and other items. The package is formed from webs of thermoplastic material and include a separable fastener strip which is reclosable to permit reclosing of the package. Forming, filling, sealing and cutting stations are included for forming the package. A heater heats the fastener strip while it is under tension prior to application to the webs to straighten the fastener strip for improved alignment and sealing.

10 Claims, 2 Drawing Sheets

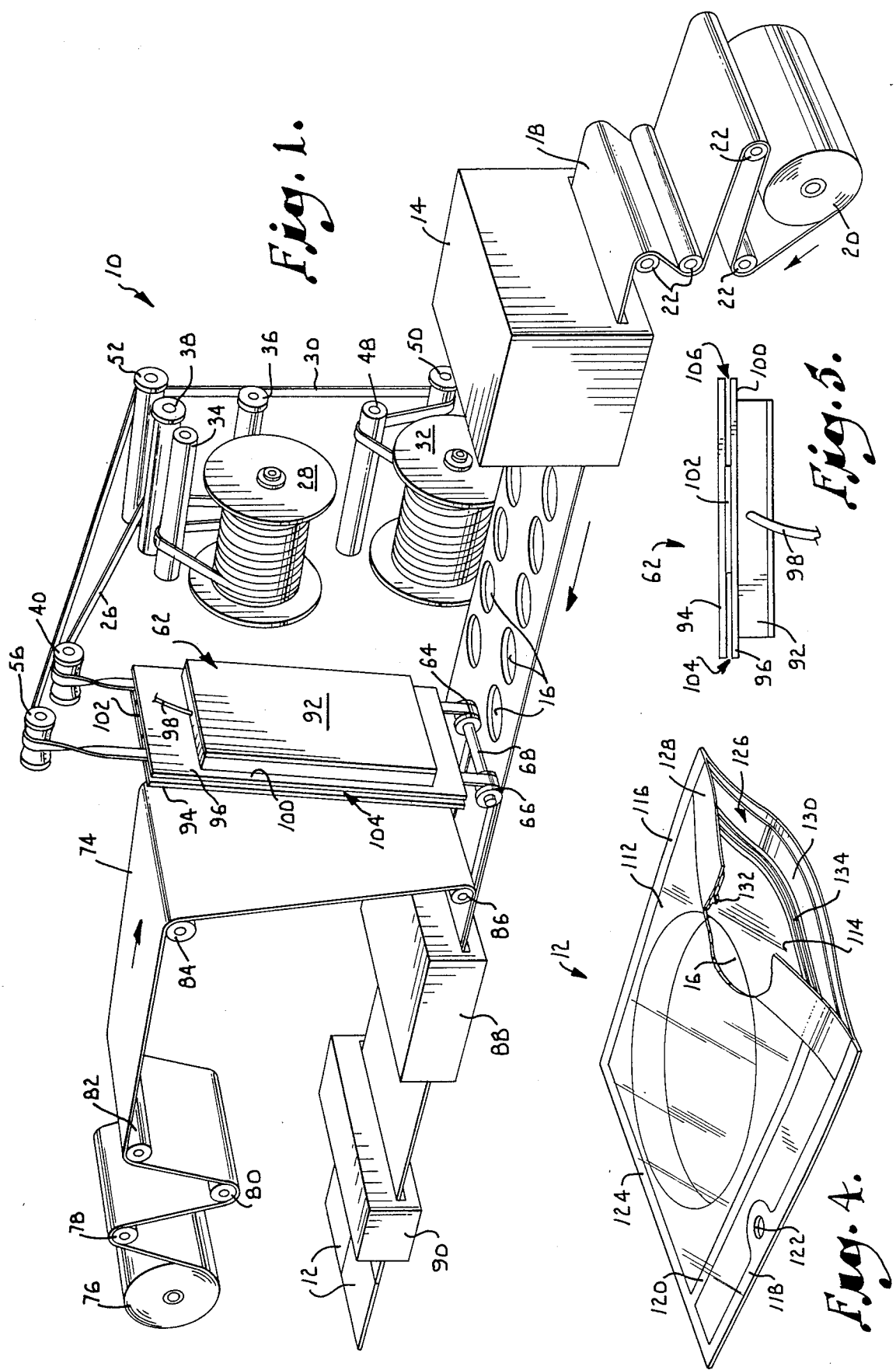

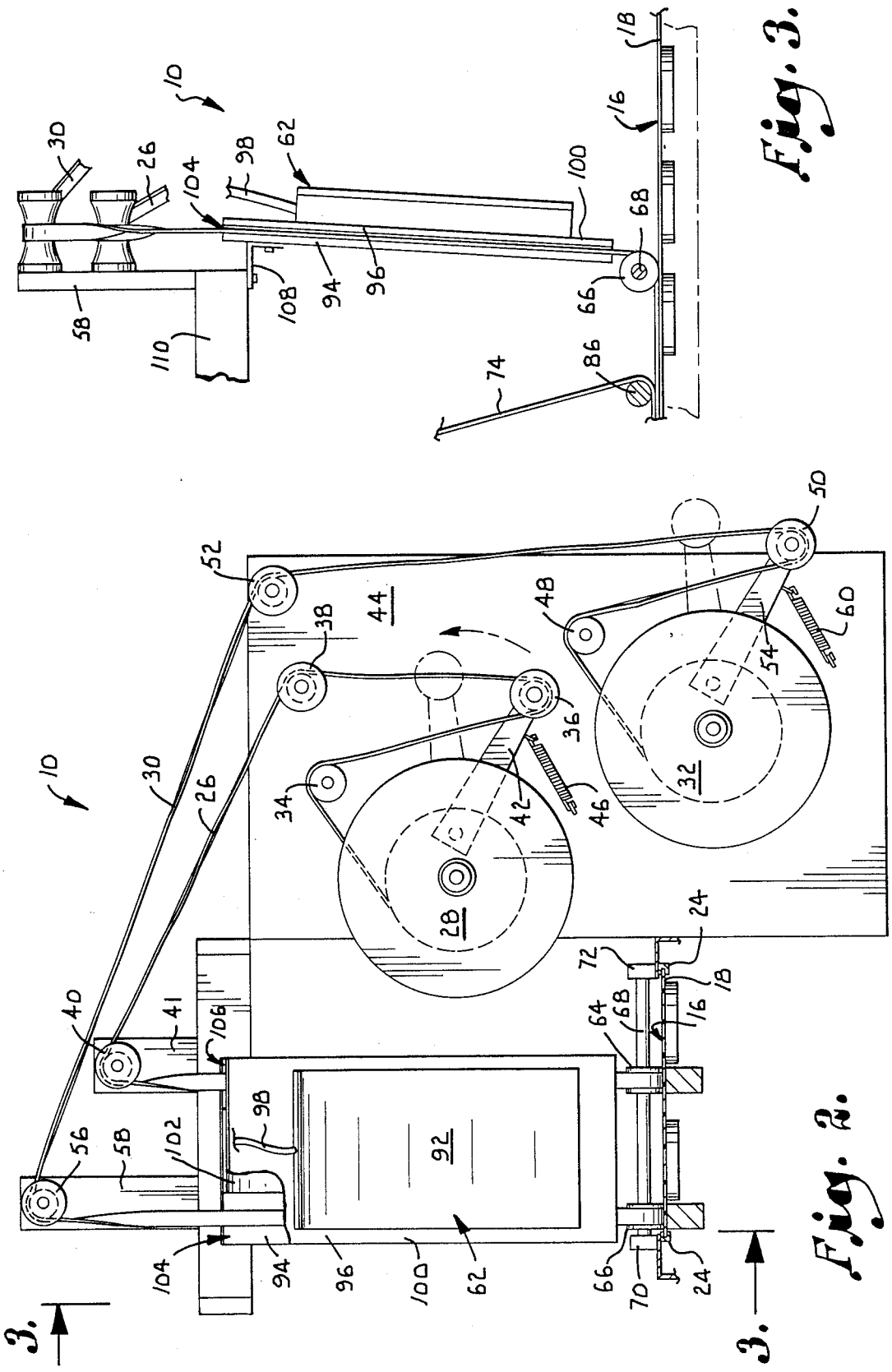

METHOD FOR APPLYING RECLOSABLE FASTENER TO PACKAGE

BACKGROUND OF THE INVENTION

This invention relates in general to an apparatus and method for making a reclosable package and, more particularly, to an apparatus and method for applying a reclosable fastener to a package for containing food products.

Packages formed from thin flexible thermoplastic materials are increasingly used for packaging food items such as sliced luncheon meats as well as a wide assortment of other products. The food item is hermetically sealed within the package to maintain the desired freshness prior to usage by the consumer. Often only a portion of the contents are utilized when the package is opened. To retain the freshness of the remaining contents of the package, a reclosable fastener is often incorporated with the package to allow the package to be reclosed after opening.

Reclosable fasteners of the type mentioned are typically formed from a strip of separable flexible material having male and female interlocks carried on opposed facing surfaces of the material. The fastener strip is sealed to the inner surfaces of the formed and covering web material which encloses the product. The fastener strip is positioned near an edge of the package to allow removal of the product or a portion thereof through the opening formed by separation of the strip. The package may then be reclosed by interlocking the fastener strip to retain the freshness and quality of the product remaining in the package.

During manufacture of the reclosable packages of this type, it is critical that the fastener strip be placed in the desired alignment with the formed and closure webs to ensure proper sealing of the package. The continuous fastener strip is typically maintained on a supply roll and brought into position between the formed and closure webs by a series of guide rollers. Improper positioning of the fastener strip has been a significant problem which results in improperly formed packages and costly manufacturing delays. Even when placed under tension, the flexible fastener strip periodically slips off of the guide rollers and must be manually repositioned. Increasing the tension applied to the fastening strip is an unsatisfactory remedy for this problem as the strip returns to its unstretched condition after the package has been formed and causes distortion of the package. The ability to manufacture reclosable packages at commercially acceptable rates has thus proven to be difficult because of the problems encountered in properly aligning the fastening strip.

SUMMARY OF THE INVENTION

It is a primary object of this invention to provide an apparatus for forming reclosable packages in a manner which allows the fastening strip to be maintained in the alignment required to effect a proper seal of the fastening strip to the package webs.

It is also an object of this invention to provide a method of maintaining the fastening strip in the desired alignment during attachment to the packaging webs at production speeds required for commercial operations so that proper package sealing is effected without the delays associated with misaligned fastening strips.

To accomplish these and other related objects of the invention, an apparatus for forming reclosable packages is provided with a heater for heating the fastener strip while it is under tension. The heater is positioned for heating the fastener strip after it is unwound from the supply roll and prior to its application to the packaging webs. It has been discovered that heating of the fastener strip while it is under tension straightens the strip to eliminate the unevenness and waves which are believed to be formed in the strip during placement of the uncured strip on the supply roll after manufacture.

Accordingly, a method of the present invention for forming a reclosable package comprises the steps of providing a web of sheet material from a supply source, providing a length of separable fastener strip, forming confronting walls of the package from the web of sheet material, tensioning and concurrently applying heat to the fastener strip, introducing the fastener strip between the confronting package walls and sealing together the confronting walls and the fastener strip to form the reclosable package.

BRIEF DESCRIPTION OF THE DRAWINGS

In the accompanying drawings in which like reference numerals are used to indicate like parts in the various views:

FIG. 1 is a side perspective view of an apparatus, shown schematically, which may be used to carry out a process according to the present invention;

FIG. 2 is an end elevational view of the apparatus of FIG. 1;

FIG. 3 is a fragmentary side elevational view of the apparatus of FIG. 1;

FIG. 4 is a side perspective view of a package which may be formed by the apparatus and method of the present invention, portions of the package being broken away to illustrate construction of a reclosable fastener strip; and FIG. 5 is a top plan view of a heater used with the apparatus of FIG. 1.

DESCRIPTION OF THE PREFERRED EMBODIMENT

Turning now to the drawings in greater detail and initially to FIGS. 1 and 2, an apparatus of the present invention is shown schematically and is represented broadly by the number 10. Apparatus 10 is an intermittent motion, form, fill and seal machine for manufacturing reclosable packages 12 of the type shown in FIG. 4. The packages 12 are formed two at a time in side-by-side relationship, but the apparatus may also be set up to manufacture the packages one at a time.

Apparatus 10 includes a forming station 14 where pockets or cavities 16 are formed in a web 18 of thin thermoplastic material which is advanced from a supply roll 20. Suitable rollers 22 are used for routing the web 18 from supply roll 20 to the forming station 14. Chain driven clips 24 (FIG. 2) are releasably attached to the side edges of the web for advancing the web along the longitudinal axis of the apparatus 10.

Forming station 14 includes suitable means (not shown) for forming adjacent pairs of cavities 16 in the web 18 upon each advancement of the web. One method for forming the cavities comprises first clamping the web to a forming die which contains adjacently positioned cavities. The web is then heated to a forming temperature which is dependent upon the type of material utilized and drawn by a pressure differential into the die cavities where it is formed and then cooled. Other forming methods known to those skilled in the art may also be used.

The web 18 may be formed from various suitable thermoformable materials, such as single or laminated layers of polyethylene, polypropylene, nylon and the like. A gas barrier layer of material such as saran or hydrolyzed ethylene-vinyl acetate copolymer may also be included. The web material is selected in conjunction with the type of food or other product which is to be packaged in cavities 16 and it will be understood that widely varying materials may be selected.

A separable, reclosable fastener web 26 formed of suitable thermoplastic material is fed from a supply roll 28 onto the advancing lower web 18. Various suitable materials may be used for fastener webs 26 and 30. Fasteners of this type may be made from polyethylene or a material available from Dow Chemical Co. under the Surlyn ® trademark. An identical reclosable fastener web 30 is also fed from another supply roll 32 onto the lower web in spaced relationship but parallel to the first fastener web 26. Fastener web 26 is routed from supply roll 28 around rollers 34, 36 and 38 to another roller 40 which is mounted on a frame 41 vertically above the advancing web 18. Roller 36 is a tensioning roller and is attached to a pivoting arm 42. Arm 42 is mounted to a suitable frame 44 which also provides a mount for supply roll 28 and the other rollers. A tensioning spring 46 is attached at one end to the frame and at the other end to the pivoting arm 42 to supply a downward tension force to the arm.

The other reclosable fastener web 30 is routed from supply roll 32 around rollers 48, 50 and 52. Roller 50 is a tensioning roller mounted on pivoting arm 54. The fastener web is then directed to a roller 56 mounted on a frame 58 above the advancing formed web 18. A spring 60 supplies a downward tensioning force to pivoting arm 52.

Preferably, the supply rolls 28 and 32 are motor driven to advance the desired length of fastener webs 26 and 30 during package formation. The rolls are positioned at one side of the apparatus with the fastener webs 26 and 30 extending transversely to the longitudinal axis of the lower web 18 as they are routed to positions vertically above the lower web on rollers 40 and 56. The fastener webs then extend generally vertically downward in side by side relationship through a heater 62 which will subsequently be described in greater detail.

The fastener webs 26 and 30 are longitudinally positioned on web 18 by guide rollers 64 and 66 which are mounted on a common shaft 68. Suitable bearings 70 and 72 are provided to permit rotation of shaft 68. The guide rollers are positioned to place fastener 30 along a side edge of web 18 with fastener web 26 being placed to the far side of a longitudinal center line of the web.

A covering web 74 of thermoplastic material is applied over the formed web 20 and fastener webs 26 and 30. Covering web 74 may comprise polyethylene, polypropylene, nylon and the like and may also include a gas barrier material previously described in conjunction with formable web 18. Unlike formable web 18, covering web 74 need not be formable (although it may be) and may thus be of a lighter gauge material. Web 74 is advanced from a supply roll 76 which may be motor driven. The web is routed over rollers 78–86. Roller 80 may be a tensioning roller similar to rollers 36 and 50 previously described. Roller 86 is positioned for placing covering web 74 directly on fasteners 26 and 30 in covering relationship to the underlying web 18.

The formed web 18, fasteners 26 and 30 and covering web 74 are then advanced to a sealing station 88 which contains suitable means (not shown) for heat sealing the fasteners to the webs and heat sealing the webs together. Various suitable means such as a heated plate and roller may be used to effect the seal. Gas flushing and evacuation may also take place in station 88. The sealed components are then advanced to a cutting station 90 where cutting blades separate the formed packages by longitudinal and transverse cuts.

Turning additionally to FIGS. 3 and 5, heater 62 comprises a heating element 92 which is coupled with a pair of spaced apart plates 94 and 96. Heating element 92 preferably comprises an electric resistance heater which is connected by electrical conductor 98 to a suitable source of electrical energy. Other types of heating mechanisms may be substituted for resistance heating element 92.

Heating element 92 is preferably sized for covering a significant portion of a back face 100 of plate 96. Plate 96 is spaced from facing plate 94 by a spacer 102 which is centrally positioned between the side edges of the plate. Spacer 102 has a thickness slightly more than that of fasteners 26 and 30 and is of a width selected so that vertical heating channels 104 and 106 are formed in the regions between the vertical edges of the spacer and the vertical edges of the plates 94 and 96. The channels 104 and 106 have widths sized for receiving fasteners 26 and 30, respectively. It is preferred that heater plates 94 and 96 be closely spaced to prevent any twisting of the webs within channels 104 and 106. The channels 104 and 106 are also preferably open along their outer side edges to facilitate positioning of the fastener webs within the channels.

Plate 94 is attached by an L-bracket 108 to frame 110 which also mounts frame elements 41 and 58. The plates 94 and 96 are positioned so that channels 104 and 106 are aligned for receiving fasteners 26 and 30 after routing over rollers 40 and 56. The lower edges of the plates are aligned with and slightly spaced from guide rollers 64 and 66 which align the fasteners on the advancing lower web 18.

Turning now to FIG. 4, reclosable package 12 which is manufactured using apparatus 10 has a top panel 112 formed from covering web 74 and a confronting bottom panel 114 from formed web 18. Bottom panel 114 contains product cavity 16 and is hermetically sealed to the top panel 112. A transverse seal 116 is formed along one side edge of the package and a similar transverse seal 118 is formed along the opposed side edge. Another transverse seal 120 is spaced inwardly from seal 118 and an aperture 122 is also positioned adjacent seal 118 for hanging the package 12 on a display rack. A longitudinal seal 124 extends between seals 116 and 118 along a third side edge of the package. A reclosure fastening strip 126 is positioned along the package side edge opposite from longitudinal seal 124. A peelable seal (not shown) is preferably positioned adjacent to fastener strip 126 and extends parallel thereto for completing the hermetic seal of the product contained within cavity 16.

Fastener 126 comprises a male or ribbed portion 128 which is sealed to an inner surface of top panel 112 and a channel portion 130 which is sealed to an inner surface of bottom panel 114. Fastener portion 128 includes a longitudinally extending rib 132 while fastener portion 130 contains a longitudinally extending channel 134. To ensure proper interlock between rib 132 and channel 134, the respective portions 128 and 130 must be placed in directly overlying relationship. The fastener 126 may be spaced slightly inwardly from the side edge of the package as illustrated or may abut the side edge.

Returning now to FIGS. 1 and 2, the operation of apparatus 10 will now be described. The formable web 18 is advanced to forming station 14 where adjacently positioned cavities 16 are formed by a process such as that previously described. The web 18 is advanced by chain driven clips 24 which grip the side edges of the web. The web is preferably advanced with an intermittent motion, that is, the web is recurringly advanced a pre-selected distance and stopped while a particular process takes place.

After formation of cavities 16, the web is advanced to an optional loading station which is not illustrated for placement of a product into the cavities. The web is then advanced to meet the fastener webs 26 and 30 which are transversely positioned for longitudinal movement in the direction of travel of the formable and covering webs by guide rollers 64 and 66 which are positoned above the top surface of web 18. The fastener web supply rolls 28 and 32 are rotated to permit advancement of the fastener webs. The covering web 74 is then applied over the advancing fastener webs 26 and 30 which have been applied to the top surface of formed web 18. The covering web overlays the cavities 16 formed in web 18.

Sealing of the fastener webs 26 and 30 to the formed and covering webs 18 and 74 takes place at sealing station 88. Likewise, the covering web 74 is sealed to formed web 18 at the sealing station. The fastener webs 26 and 30 are sealed along the longitudinal length of web 18 with one fastener being placed along the side edge of the web and the other fastener being placed to the other side of a longitudinal center line of the web 18. Depending upon the particular process utilized, the seals may be effected concurrently or in any order desired. For instance, concurrent sealing of the fastener webs to either web 18 or 74 and sealing together webs 18 and 74 along two seams may first take place followed by concurrent sealing of the fastener webs to the other of webs 18 or 74 and sealing together of the webs 18 and 74 along the other two other seams. Gas flushing and evacuation may also take place in a conventional fashion in sealing station 88. After sealing, the web material is advanced to cutting station 90 where a longitudinal center cut and a transverse cut are made to separate the formed packages 12.

Referring additionally to FIGS. 3 and 5, the purpose and operation of heater 62 will now be described. It has been discovered that heating fastener webs 26 and 30 greatly reduces the alignment problems which have been previously experienced when applying the fastener webs to the formed and covering webs. The fastener webs are formed from an extrusion process and are in many cases wound onto supply rolls in a partially uncured state. The fastener web is wound back and forth across the supply spool and because it is of an uneven thickness, the fastener web lies at a slight angle to the axis of the supply roll. As the material then cures, an uneven configuration is locked into the web due to its positioning on the supply roll. As is illustrated in FIG. 2, when the fastener webs 26 and 30 are unwound from supply rolls 28 and 32, they have a wavy appearance with a number of irregularities.

To eliminate the irregularities formed in webs 26 and 30, they are routed through channels 104 and 106 formed in heater 62 where they are heated. Heat is supplied by heating element 92 and is distributed to plates 94 and 96. The invention is not limited to the heater 62 illustrated and various other suitable types of heating of the fastener webs 26 and 30 may be utilized. As the webs are heated, they are also maintained under tension by tensioning arms 42 and 52 with their respective tensioning springs 46 and 60. The close spacing of plates 94 and 96 also prevents any twisting of the webs. Heating the webs while under tension relaxes the irregularities in the webs and the straightened webs are then routed to guide rollers 64 and 66. Because of their straightened condition, the webs are maintained in the desired alignment without the periodic disengagement from the guide rollers which had been previously experienced.

The residence time of lengths of fastener webs 26 and 30 within channels 104 and 106 must be sufficient to allow adequate heating and relaxation of the fastener webs. The heater is preferably of a sufficient vertical length so that a given length of the fastener webs is maintained within channels 104 and 106 during two registration cycles of the apparatus. In other words, the channel length should be at least twice the length of the fastener web advanced during each registration cycle of the apparatus.

It has been found that heating the flexible webs 26 and 30 to temperature within the range of approximately 50° C. to approximately 125° C. for a time period within the range of approximately 4 to 24 seconds while under tension is sufficient to straighten the fastener webs. The heating time would correspond to the apparatus 10 being operated at registration cycles of approximately 5 to 30 cycles per minute, assuming that the heating channels 104 and 106 are twice the registration length of the fastener webs. The maximum heating temperature must be below the melting point of the particular material utilized for flexible webs 26 and 30. The maximum temperature is also preferably selected so that softening of the material to an extent whereby it could become permanently distorted does not occur should the heater remain on while the apparatus is stopped for an extended length of time. A preferred heating temperature is 70° C. for a time period of 10 seconds.

It can thus be seen that the provision of heater 62 for heating the fastener web while under tension removes the unevenness in the webs which is believed to result from wrapping the webs on supply spools while in an uncured state. The straightened fastener webs may then be introduced between the formed web 18 and covering web 74 in the exact alignment required to insure proper sealing of the fastener webs to the formed and covering webs without the misalignment problems which had previously occurred.

It will be appreciated that the method, apparatus and article of the present invention will find applicability to reclosable packages with hermetic seal means located inboard, outboard or as a part of the reclosure strip as well as with packages which do not employ any hermetic seal means.

From the foregoing, it will be seen that this invention is one well adapted to attain all the ends and objects hereinabove set forth together with other advantages which are obvious and which are inherent to the structure.

I will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A method for forming a reclosable package having confronting walls, said method comprising the steps of:
   providing a web of sheet material from a supply source;
   providing an extended length of separable fastener strip from a supply source;
   forming said confronting walls of said reclosable package from said web of sheet material;
   directing said fastener strip along a linear path of travel toward said confronting walls;
   tensioning said fastener strip in a linear direction along said path;
   heating said fastener strip across its entire cross sectional dimension while said tensioning step occurs and before said fastener strip reaches said confronting walls;
   continuing advancement of said fastener strip in a linear direction;
   then introducing said fastener strip between the confronting walls;
   sealing said fastener strip to the confronting walls; and
   sealing together the confronting walls to form said reclosable package.

2. The method of claim 1, wherein the step of tensioning and concurrently applying heat to the fastener strip comprises the step of heating the fastener strip to a temperature within the range of approximately 50° C. to 125° C.

3. A method for forming a reclosable package comprising the steps of:
   providing a first web of sheet material from a supply source;
   providing a length of separable fastener strip from a supply source;
   providing a second web of sheet material from a supply source;
   placing a product on said first web of sheet material;
   directing said fastener strip along a linear path of travel toward said confronting walls;
   tensioning said fastener strip in a linear direction along said path;
   heating said fastener strip across its entire cross sectional dimension while said tensioning step occurs and before said fastener strip reaches said confronting walls;
   continuing advancement of said fastener strip in a linear direction;
   then introducing said fastener strip between the confronting walls;
   sealing said fastener strip to the confronting walls; and
   sealing together the confronting walls to form said reclosable package.

4. The method of claim 3, wherein the step of applying heat to the fastener strip while under tension comprises the step of heating the fastener strip to a temperature within the range of approximately 50° C. to 125° C.

5. The method of claim 3, including the step of supplying a heating bar to heat said fastener strip while under tension.

6. The method of claim 3, wherein the steps of sealing the fastener strip to the first and second webs and sealing together the first and second webs comprise the steps of first concurrently sealing the fastener strip to one web and sealing together the first and second webs along two seams and then concurrently sealing the fastener strip to the other web and sealing together the first and second webs along two other seams to form the reclosable package with the product sealed therein.

7. A method for forming a reclosable package comprising the steps of:
   providing a first web of sheet material from a supply source;
   providing an extended length of separable fastener strip from a supply source;
   providing a second web of sheet material from a supply source;
   directing said fastener strip along a linear path of travel toward said confronting walls;
   tensioning said fastener strip in a linear direction along said path;
   heating said fastener strip across its entire cross sectional dimension while said tensioning step occurs and before said fastener strip reaches said confronting walls;
   continuing advancement of said fastener strip in a linear direction;
   then introducing said fastener strip between said first and second webs with said second web covering the first web;
   sealing said fastener strip to said first web and said second web; and
   sealing together the first web and the second web to form said reclosable package.

8. The method of claim 7, including the step of placing a product between said first and second webs of sheet material and then sealing together the first and second webs to form said reclosable package with said product sealed therein.

9. The method of claim 7, wherein the step of applying heat to the fastener strip while under tension comprises the step of heating the fastener strip to a temperature within the range of approximately 50° C. to 125° C.

10. The method of claim 8, wherein the steps of sealing the fastener strip to the first and second webs and sealing together the first and second webs comprise the steps of first concurrently sealing the fastener strip to one web and sealing together the first and second webs along two seams and then concurrently sealing the fastener strip to the other web and sealing together the firs and second webs along two other seams to form the reclosable package with the product sealed therein.

* * * * *